United States Patent [19]
Neri

[11] Patent Number: 5,865,242
[45] Date of Patent: Feb. 2, 1999

[54] MODULES FOR MASS TRANSFER AND OTHER APPLICATIONS AND METHODS OF USE

[76] Inventor: Bruno Neri, Via Vincenzo Monti, 51, Mailand, Italy

[21] Appl. No.: 732,473

[22] PCT Filed: May 5, 1995

[86] PCT No.: PCT/EP95/01715

§ 371 Date: Jan. 21, 1997

§ 102(e) Date: Jan. 21, 1997

[87] PCT Pub. No.: WO95/30868

PCT Pub. Date: Nov. 16, 1995

[30] Foreign Application Priority Data

May 6, 1994 [IT] Italy .............................. MI94 A 0885

[51] Int. Cl.⁶ ..................................................... B01F 3/04
[52] U.S. Cl. ...................... 165/115; 261/111; 261/112.1; 165/116
[58] Field of Search ................................ 165/115, 116; 261/112.1, 108, 111

[56] References Cited

U.S. PATENT DOCUMENTS

| | | |
|---|---|---|
| 3,751,017 | 8/1973 | Lemmens ................................. 261/111 |
| 4,107,241 | 8/1978 | Braun ................................. 261/112.1 X |
| 4,276,242 | 6/1981 | Chen et al. ............................... 261/111 |
| 4,337,217 | 6/1982 | Braun ..................................... 261/112.1 |
| 4,477,394 | 10/1984 | Armstrong et al. ................. 261/112.1 |
| 4,497,751 | 2/1985 | Pluss ................................. 261/112.1 X |
| 4,497,752 | 2/1985 | Huber ............................... 261/112.1 X |
| 4,497,753 | 2/1985 | Streiff ............................... 261/112.1 X |
| 4,532,086 | 7/1985 | Pluss ................................. 261/112.1 X |
| 4,728,468 | 3/1988 | Duke ....................................... 261/111 |
| 4,996,008 | 2/1991 | Peterson ................................. 261/111 |
| 5,017,309 | 5/1991 | Peterson ................................. 261/111 |

FOREIGN PATENT DOCUMENTS

| | | | |
|---|---|---|---|
| 34 33 268 | 3/1986 | Germany . | |
| 75663 | 6/1977 | Japan ..................................... 261/111 |
| 940816 | 7/1982 | U.S.S.R. ................................. 261/108 |
| 1285495 | 8/1972 | United Kingdom ................ 261/112.1 |

OTHER PUBLICATIONS

CTI Journal, vol. 12, No. 1, pp. 19 and 31–46, Date Unknown.

*Primary Examiner*—Leonard R. Leo
*Attorney, Agent, or Firm*—Lowe Hauptman Gopstein Gilman & Berner

[57] ABSTRACT

A modular heat exchanging element including a frame, vertical plates and ribs. The individual heat exchanging elements can be coupled together and/or layered on top of each other and can be manufactured by one single thermal fusion process.

10 Claims, 4 Drawing Sheets

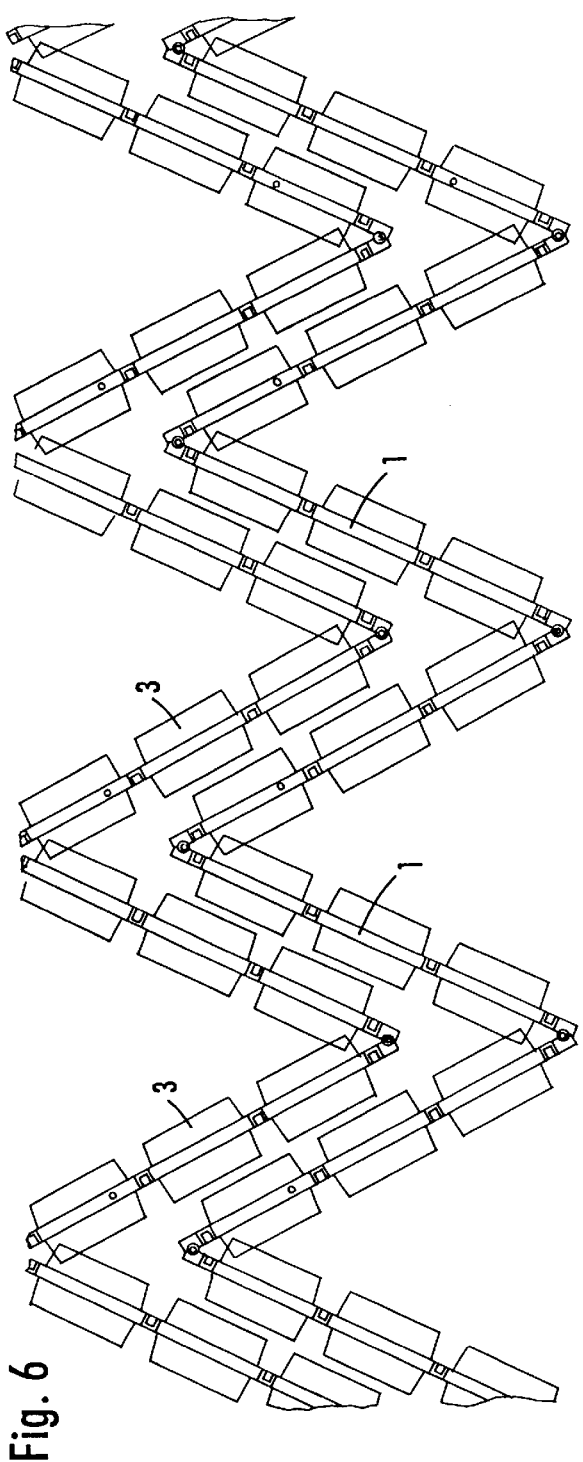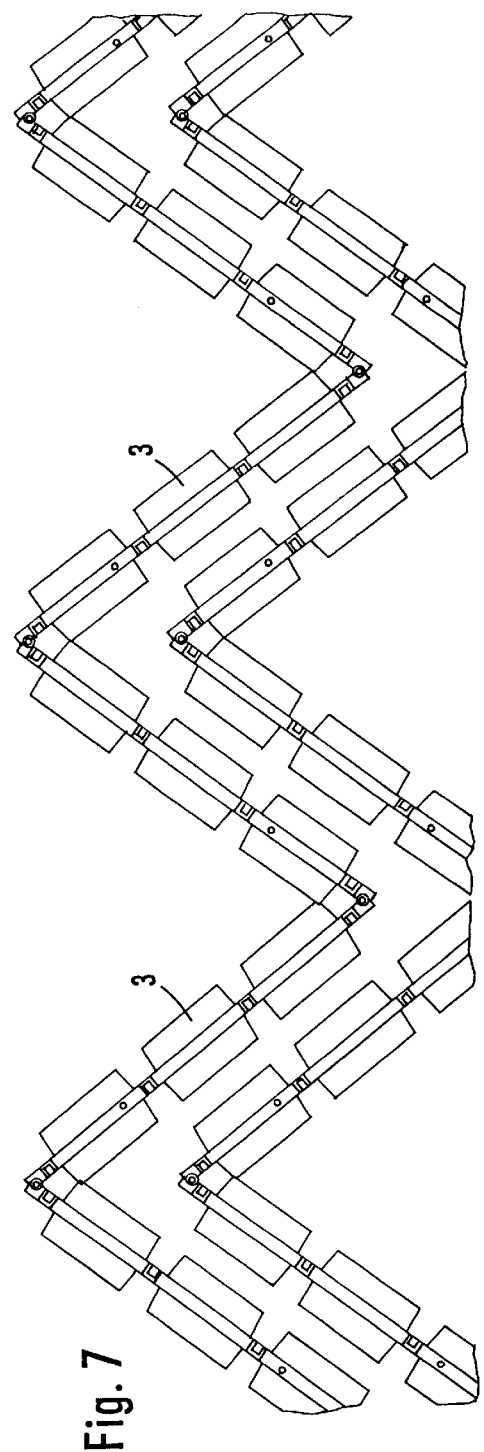

MODULES FOR MASS TRANSFER AND OTHER APPLICATIONS AND METHODS OF USE

BACKGROUND OF THE INVENTION

1. Field of the Invention

2. Description of the Related Art

Two types of heat exchangers currently exist.

The first uses the "splash"-process as shown in FIG. 1 provides grids or such like that enable the splitting of water drops during their downfall in the evaporation tower. The split water drops hit a stream of air and are cooled due to the forced evaporation of the water.

The second type of heat exchanger uses the "film"-process as shown in FIG. 2 which provides differently shaped plastic plates that are stuck together. During its descent covers the plates as a "film". The stream of air sweeping over the water-"film" causes the evaporation of the water and thus cools the water.

The "film"-process is disadvantageous in that it uses the entire space while being transported and is susceptible to blockage caused by small foreign particles. The "splash"-process is disadvantageous in that manpower is needed for its installation at the operational site and due to the fact that it is operationally inefficient.

SUMMARY OF THE INVENTION

It is an object of the present invention to eliminate the disadvantages of the known processes, i.e. to design a more effective and economical heat exchanger.

The present invention is directed to a panel comprising a plurality of frames and vanes connected between said frames. Outer ones of the frames include connecting mechanisms attached thereto to enable the panel to be coupled to at least one other said panel which are movable relative to each other about said connecting mechanisms into a desired position to thereby align and differently adjust the vanes relative to a flow of at least one fluid through the panel.

In the preferred embodiment, the connecting mechanisms including projecting studs and receiving studs provided on the outer ones of the frame for pivotally coupling individual ones of the panels together in positions at different angles.

The panel is preferably formed in a one shot injection molding operation.

The present invention also concerns a panel assembly, comprising at least two panels, each panel including a pair of outer frame members, at least one intermediate frame member extending parallel to the outer frame members, and a plurality of vanes connected between the outer and intermediate frames to form the panel structure. Connecting arrangements attached to the outer frame members facilitate pivotal connection of one said panel to another said panel. The panels extend at a selected acute angle to each other.

The connecting arrangements are preferably hinged connections between adjacent ones of the panels.

The connecting arrangements preferably include first projecting connectors formed along one outer frame member and second receiving connectors formed along the other outer frame member. The first and second connectors of the adjacent panels enable interconnection to achieve a succession of interconnected panels.

The present invention also concerns a method of achieving mass transfer between two fluids. The method comprises the steps of introducing a first fluid into a module where the first fluid flows through first through first and second series of vanes. A second fluid is introduced into the module where the second fluid flows through the first and second series of vanes and contacts the first fluid. If one of the first an second fluid is a liquid, then the interaction of the first and second fluids with the first and second series of vanes causes the liquid to splash and film onto the second series of vanes from the first series. If one of the fluids is a gas, then the first and second series of vanes cause deflection in the flow of the gas. The module is a panel and a plurality of the panels are interconnected to each other at a predetermined but variable angle greater than zero degrees.

In further accordance with the method of the invention, the first and second series of vanes are oppositely inclined relative to each other.

The predetermined angle is determined based on specific flow parameters within the operating environment.

The first and second series of vanes in each one of the panels can be fixedly positioned at a selected angle relative to the flow of one of the first and second fluids and the first and second series of vanes in the other of the interconnecting panels can be fixedly positioned at the same or different angle relative to the flow.

BRIEF DESCRIPTION OF THE DRAWINGS

The inventive heat exchanging element is described in the following according to the drawings.

FIG. 6 is a top view of two rows of interconnected heat exchanging elements.

FIG. 7 is a top view of the rows shown in FIG. 6 in a different angular position.

DESCRIPTION OF THE PREFERRED EMBODIMENTS

Figure 1:
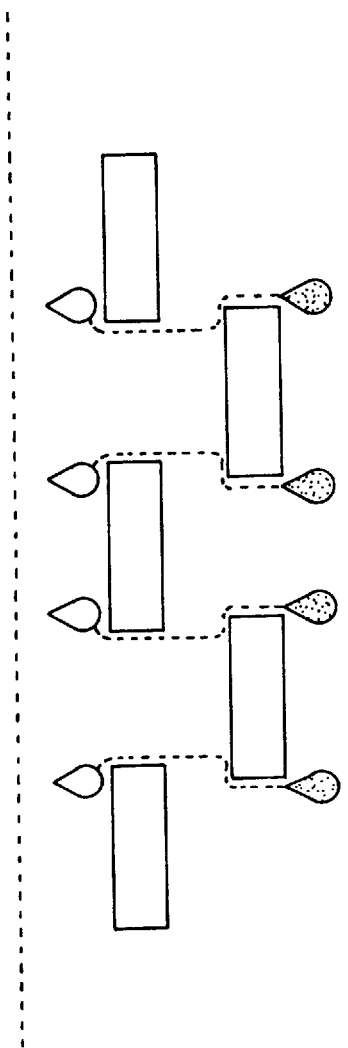
FIG. 1 is a view of a "splash" process prior art design.
Figure 2:
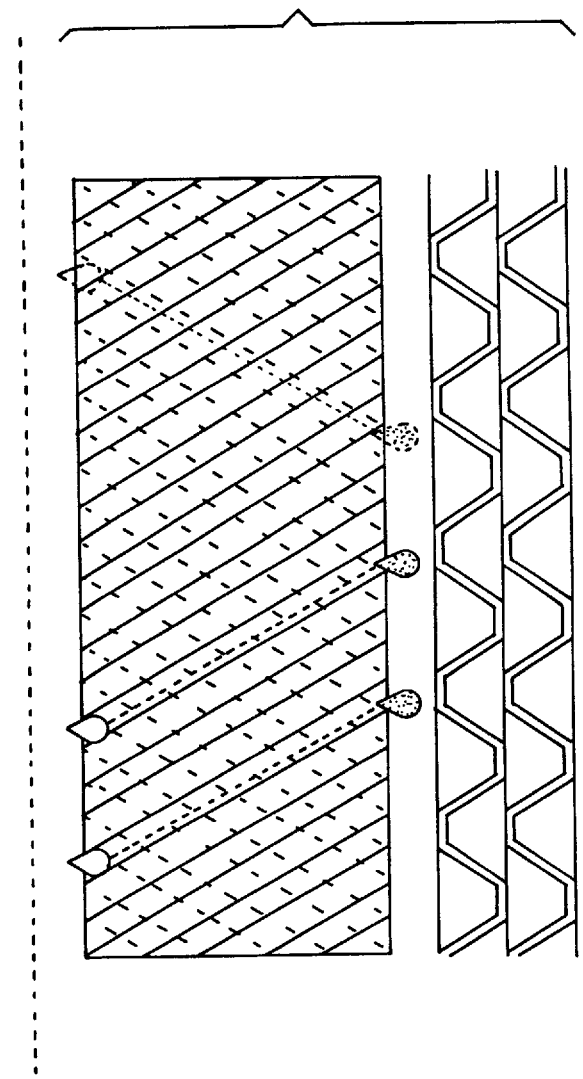
FIG. 2 is a view of a "film" process prior design.
Figure 3:
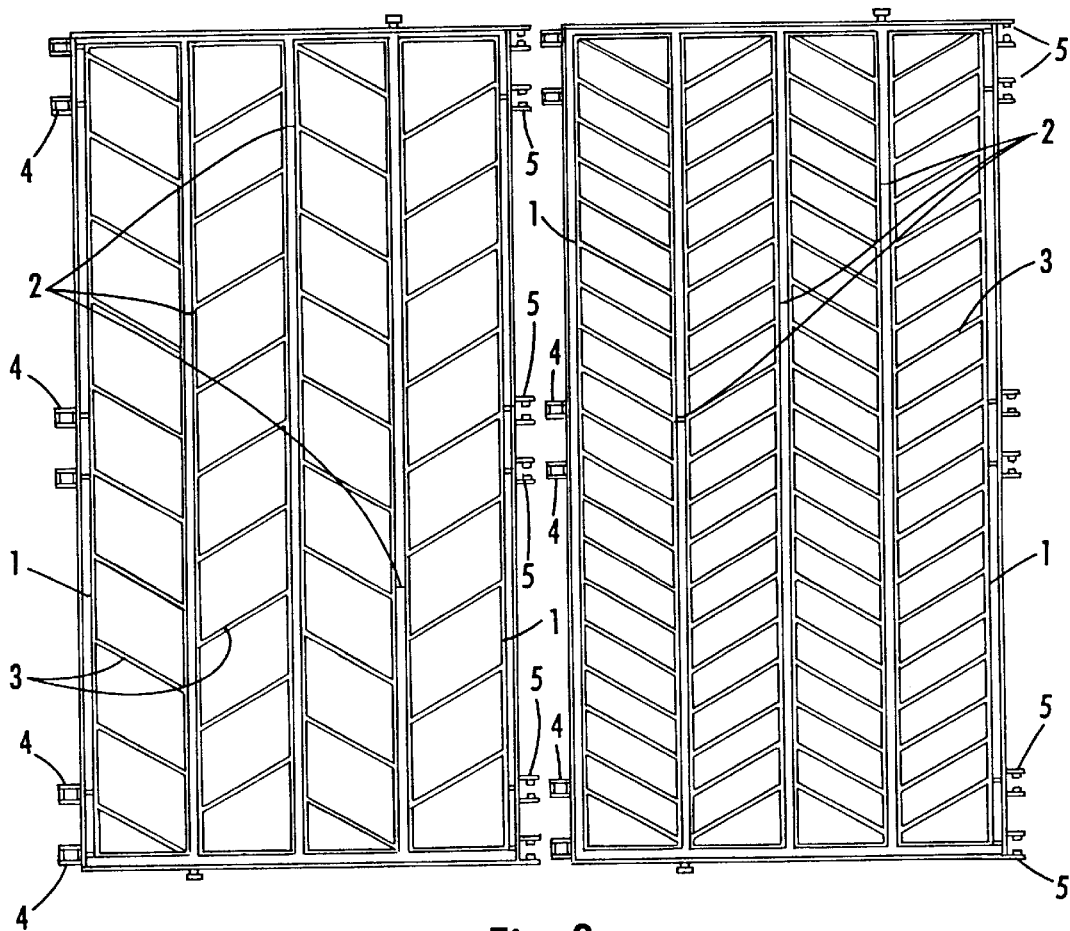
FIG. 3 is a graphic showing of two heat exchanging elements arranged side by side
Figure 4:
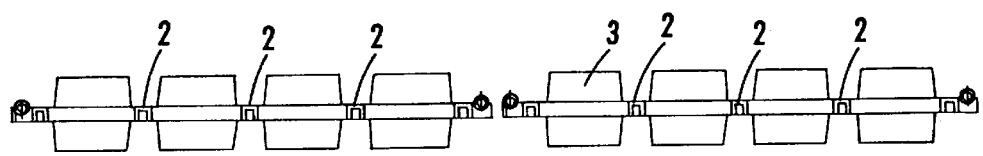
FIG. 4 is a view from above of both heat exchanging elements.
Figure 5:
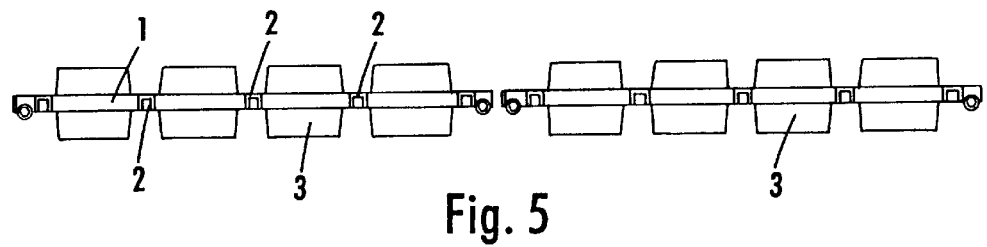
FIG. 5 is a view from below of both heat exchanging elements.

Each separate heat exchanging element consists of an outer frame 1 and interior vertical plates. Ribs 3.

Ribs 3 are disposed between the outer frame 1 and the individual interior vertical plates or webs 2. The blades 3 can possess different positions and inclinations. Protruding and receiving plugs 4 and 5 are respectively located at the outer frame 1 and function as connecting mechanisms to enable the coupling between the individual heat exchanging elements.

In this specification, ribs 3 are also referred to as blades or vanes. Outer frame 1 and vertical plates 2 are collectively referred to as frame members. In addition, outer ones of said frame members (i.e., outer frame 1) are referred to as outer frame members while vertical plates 2 are referred to as intermediate frame members.

As shown in FIGS. 6 and 7 different angular positions can be obtained because of the coupling between the individual heat exchanging elements. Moreover, the product is made adaptable to differing capacity demands as a result of the possibility of adjusting the orientation of the ribs 3.

Figure 8:
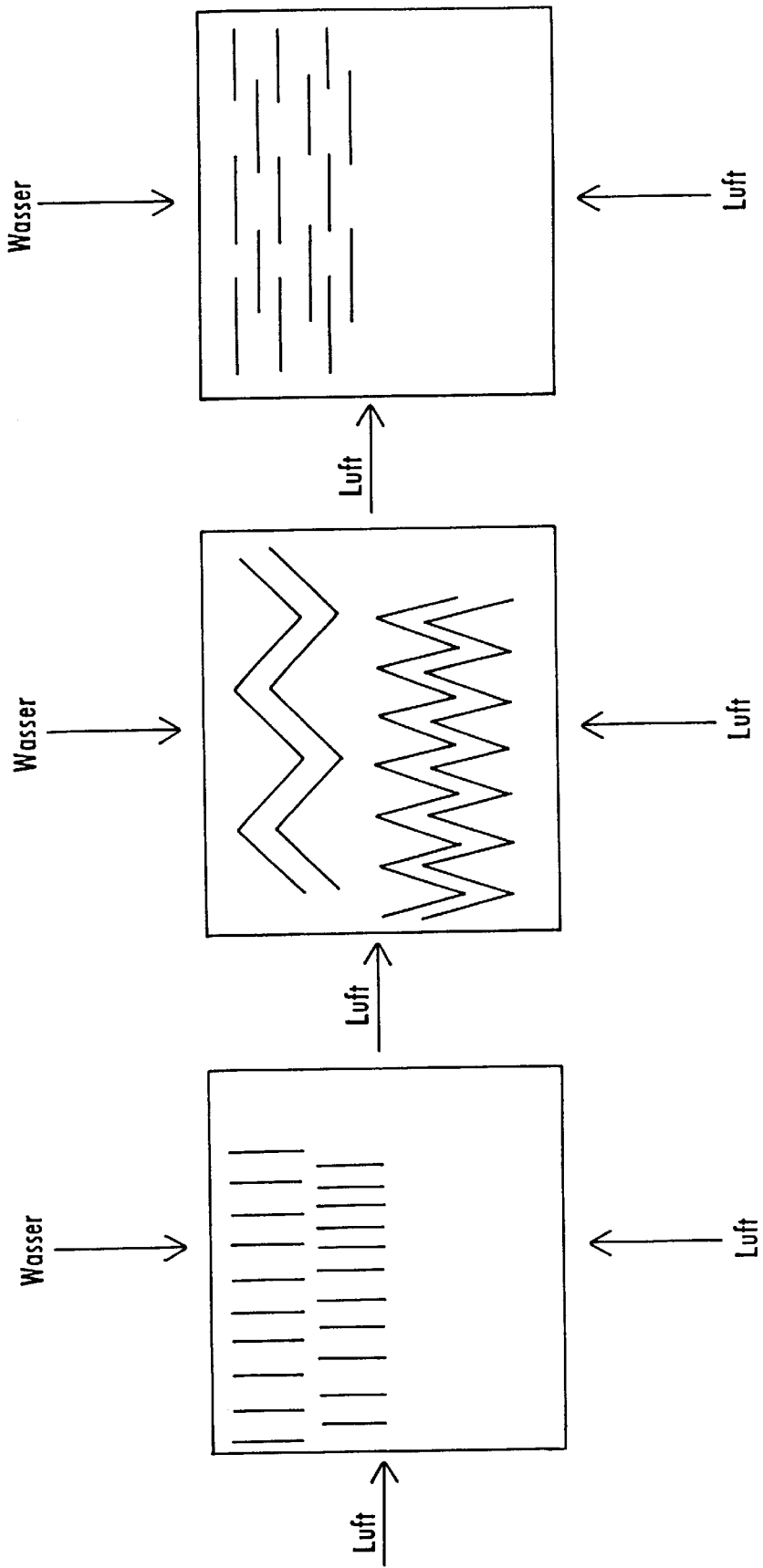
FIG. 8 is a graphic showing of different arrangement possibilities of heat exchanging elements inside a liquid cooler.

In FIG. 8 different positions of the heat exchanging elements are shown schematically which are coupled together and/or are layered on top of each other inside a liquid cooler. The geometric shape of the contacting surface and the arrangement facilities keep the capacity variable due to an almost infinite number of positions and make the maintenance easier.

Since the material is consisting of one individual modular element, the manufacturing and storing is enabled for one individual product which is adaptable to each demanded capacity. Besides, the inventive heat exchanging element requires space during transport and storing at the very best of only 15% of that needed after installation. The modular element formed heat exchanger of the present invention can be manufactured by one single thermal fusion process.

What is claimed is:

1. A panel, comprising a plurality of frames and vanes (3) connected between said frames, outer ones of said frames including connecting mechanisms attached thereto to enable said panel to be coupled to at least one other said panel which are moveable relative to each other about said connecting mechanisms into a desired position to thereby align and differently adjust said vanes (3) relative to a flow of at least one fluid through said panel.

2. A panel according to claim 1, wherein said connecting mechanisms include projecting studs (4) and receiving studs (5) provided on said outer ones of said frame for pivotably coupling individual ones of said panels together in positions at different angles.

3. A panel according to claim 1, wherein said panel is formed in a one-shot forming operation.

4. A panel assembly comprising at least two panels, each panel including a pair of outer frame members; at least one intermediate frame member extending parallel to said outer frame members; a plurality of vanes connected between said outer and intermediate frames to form the panel structure; and connecting arrangements attached to said outer frame members to facilitate pivotal connection of one said panel to another said panel, wherein said panels extend at a selected acute angle to each other.

5. The panel of claim 4, wherein said connecting arrangements are pivotal connections between adjacent ones of said panels.

6. The panel of claim 4, wherein said connecting arrangements include first projecting connectors formed along one said outer frame member and second receiving connectors formed along the other said outer frame member, whereby said first and second connector of adjacent panels enable interconnection to achieve a succession of interconnected panels.

7. A method of achieving mass transfer between two fluids, comprising the steps of:
  a) introducing a first fluid into a module where the first fluid flows through first and second series of vanes;
  b) introducing a second fluid into the module where the second fluid flows through the first and second series of vanes and contacts the first fluid, whereby if one of said first and second fluids is a liquid then the interaction of the first and second fluids with the first and second series of vanes causes the liquid to splash and film onto the second series of vanes from the first series, and if one of said fluids is a gas, then the first and second series of vanes causes deflection in the flow of said gas; and
  (c) wherein said module is a panel, and a plurality of said panels are interconnected to each other at a predetermined but variable angle greater than zero degrees.

8. The method of claim 7, wherein the first and second series of vanes are oppositely inclined relative to each other.

9. The method of claim 7, wherein said predetermined angle can be determined based on specific flow parameters within the operating environment.

10. The method of claim 9, wherein the first and second series of vanes in each one of the panels can be fixedly positioned at a selected angle relative to the flow of one of said first and second fluids and the first and second series of vanes in the other of said interconnected panels can be fixedly positioned at the same or different angle relative to said flow.

* * * * *